Figure 1:
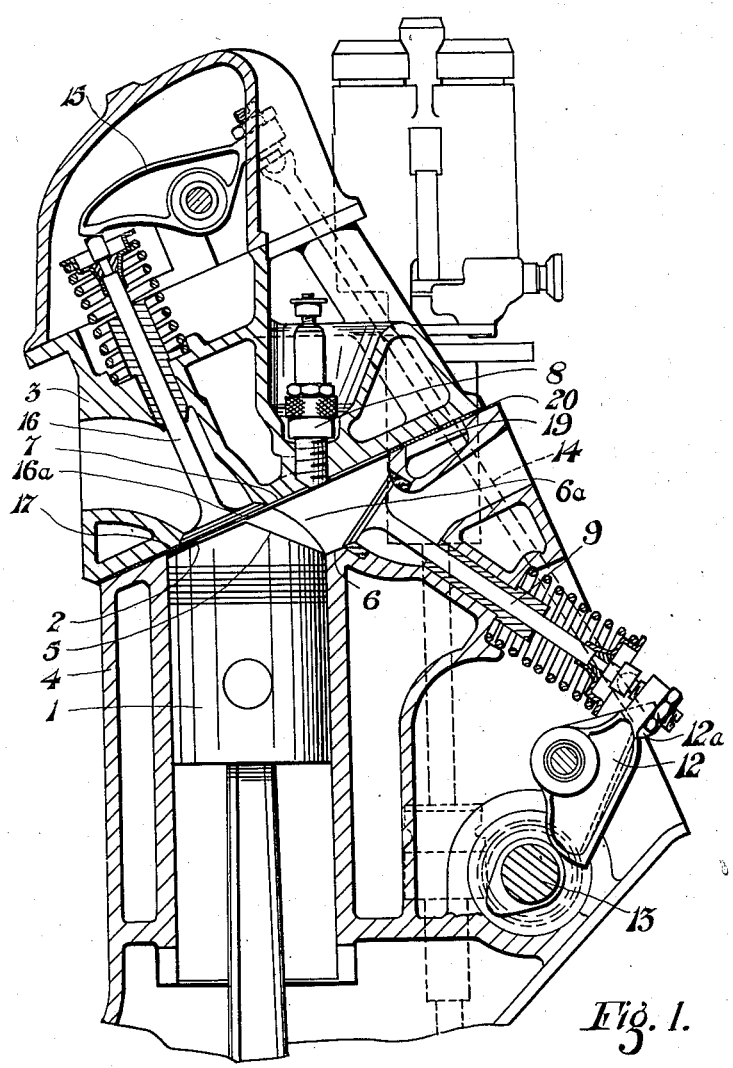

May 12, 1942.  J. SWAINE  2,282,435

COMBUSTION CHAMBER OF SPARK-IGNITED INTERNAL COMBUSTION ENGINES

Filed Sept. 5, 1939

Inventor
John Swaine
by Mawhinney &
Mawhinney
Attorneys

Patented May 12, 1942

2,282,435

UNITED STATES PATENT OFFICE 2,282,435

COMBUSTION CHAMBER OF SPARK-IGNITED INTERNAL COMBUSTION ENGINES

John Swaine, Coventry, England, assignor to The Rover Company Limited, Coventry, England Application September 5, 1939, Serial No. 293,464
In Great Britain January 10, 1939

11 Claims. (Cl. 123—191)

This invention relates to a spark-ignition internal-combustion engine—i. e., to one in which a preformed combustible mixture is compressed in a cylinder prior to ignition by electric spark— and particularly to such an engine as operates on the four-stroke cycle.

The main object of the invention is to provide an improved arrangement of the combustion space, sparking-plug and valves whereby a relatively-high compression-ratio can be used with satisfactory results.

A spark-ignition internal-combustion engine, in accordance with the present invention, has at top dead centre a combustion space bounded by one flat wall and by one of generally part-spherical form, with a sparking-plug disposed in the flat wall, for example, near the centre thereof, and with one valve disposed in the wall of generally part-spherical form. The engine also has a detachable cylinder-head provided with a continuous flat face which forms the jointing face and is in a plane which is inclined at an acute angle to the cylinder axis, and another valve is disposed in the said flat face. Part of the said flat face constitutes the said flat wall of the combustion space.

In a preferred arrangement according to the invention, the head of the piston is of substantially inverted-V shape in cross-section, and one side of the head approaches a part of the flat face of the cylinder-head at top dead centre with a minimum of clearance. The other side at top dead centre is flush with and slightly inclined to the adjacent portion of a wall of a part-spherical recess formed in the cylinder block, the edge of this wall being substantially part-cylindrical adjacent the cylinder bore. This said other side of the piston head forms with the wall of the recess and with a part of the flat face of the cylinder-head the combustion space.

It is preferably an exhaust valve which is seated in the generally part-spherical wall of the combustion space and an inlet valve which is seated in the flat face of the cylinder-head. The inlet valve may be arranged in the cylinder-head to lie adjacent that side of the piston head which approaches a part of the flat face of the cylinder-head at top dead centre. A single camshaft may be provided for actuating, as through rockers, the valve disposed in the part-spherical wall and a push-rod for the valve disposed in the flat face.

Whilst reference is made above to an engine as though it were a single-cylinder engine, obviously the invention is equally applicable to all the cylinders of a multi-cylinder engine.

Figure 2:
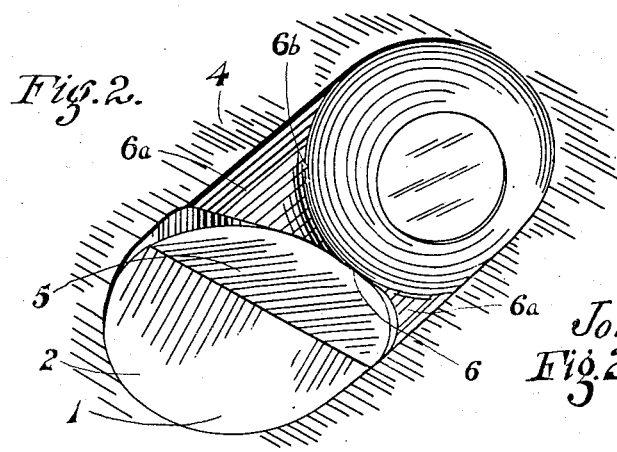

In the accompanying drawing:

Figure 1 is a part-sectional elevational view of one of the cylinders of an internal-combustion engine arranged according to the invention; and Figure 2 is a perspective plan view of the combustion space.

The drawing shows a piston 1 the head of which is of penthouse form or of inverted-V shape in cross-section, one side 2 being parallel to the adjacent part of the continuously-flat jointing face of the cylinder-head 3, the plane of the joint between the latter and the cylinder block 4 being inclined at an acute angle to the main axis of the piston. This side 2 of the piston, at the top dead centre position shown in both figures, approaches the adjacent part of the inclined face of the cylinder-head with a minimum of clearance, as shown. In these conditions the lower edge of the other side 5 of the piston-head is flush with and slightly inclined to the adjacent portion of a wall 6 of a part-spherical recess provided in the adjacent side of the cylinder block, and this side 5 and the part-spherical wall 6 form with the part 7 of the continuously-flat face of the cylinder-head a combustion space which is substantially part-spherical in shape. Actually the edge of the wall 6 adjacent the cylinder bore is preferably substantially part-cylindrical where it merges with the cylinder bore, as indicated at 6a, the cylindrical portion 6a merging with the part-spherical portion 6 round about the line 6b. The wall 6 may be milled out by a spherical cutter, and the latter then traversed parallel to the top of the cylinder block to form the wall 6a. A sparking-plug 8 carried by the cylinder-head is disposed substantially at the centre of the part 7 of the flat face of the cylinder-head which forms the boundary for the combustion space.

9 represents an exhaust valve opening directly through the part-spherical wall 6. The valve is operable by a rocker 12 from a camshaft 13 disposed alongside the cylinder block. Another rocker 12a engaged with the camshaft coacts with a push rod 14 the upper end of which acts through a rocker 15 on an overhead inlet valve 16. This, it will be observed, communicates with the port 17 of the inclined face of the cylinder-head which lies adjacent the side 2 of the piston-head at the top dead centre position. Only a relatively small portion of the inlet valve overlaps the combustion space, as indicated at 16a.

It will be observed that adequate cooling liquid passages are provided round the sparking-plug and the exhaust valve and, as a matter of convenience, and to facilitate the casting of the cylinder block, the drawing shows a part 19 of the cooling passage round the exhaust valve as being closed by the gasket 20 between the cylinder-head and cylinder block, thus facilitating inspection.

Owing to the camshaft being disposed along the side of the cylinder block the driving mechanism therefor can be very simply arranged and naturally only one push rod is required per cylinder. By arranging the piston, combustion space, sparking-plug and the valves in the manner described the engine can be operated at a relatively-high compression-ratio in a satisfactory manner, the close approach of the side 2 of the piston head to the adjacent part of the inclined face of the cylinder-head serving near top dead centre for directing a high-speed stream of the charge into the combustion space past the sparking-plug, and thus producing very satisfactory turbulence. Moreover, all the surfaces of the combustion space can be adequately machined in a very simple manner.

What I claim as my invention and desire to secure by Letters Patent of the United States is:

1. A spark-ignition internal-combustion engine comprising a cylinder block having a cylinder bore therein, a piston adapted to reciprocate in said bore, a detachable cylinder-head having a continuous flat jointing face, said jointing face and the co-operating jointing face of the cylinder block being inclined at an acute angle to the axis of the bore, and said cylinder block having a part-spherical recess which is less than hemispherical formed in it to break into that side of the bore which is the longest, the wall of said recess extending to the flat face of the cylinder-head and joining the bore by part-cylindrical portions, said piston having a head providing oppositely-inclined faces, one of said faces shaped to lie closely adjacent said flat jointing face of said cylinder-head at top-dead-centre and the other face shaped to provide part of the wall of the combustion space at top-dead-centre.

2. A spark-ignition internal-combustion engine comprising a cylinder block having a cylinder bore therein, a piston adapted to reciprocate in said bore, a detachable cylinder-head provided with a continuous flat jointing face, said cylinder block having a co-operating jointing face and said faces being inclined at an acute angle to the axis of the bore, said cylinder block also having a recess of roughly part-spherical shape formed in it to break into that side of the bore which is the longest, the wall of said recess extending from the jointing face of the cylinder-head to the adjacent portion of the piston head when the latter is at top dead centre, said piston having a head providing oppositely-inclined faces, one of said faces shaped to lie closely adjacent said flat jointing face of said cylinder-head at top-dead-centre and the other face shaped to provide part of the wall of the combustion space at top-dead-centre.

3. A spark-ignition internal-combustion engine comprising a cylinder block having a cylinder bore therein, a piston having a head providing oppositely-inclined faces, a detachable cylinder-head provided with a continuous flat jointing face, said cylinder block having a co-operating jointing face and said faces being inclined at an acute angle to the axis of the bore and being parallel to one of the faces of the piston head, said piston being adapted to reciprocate in said bore with a minimum of clearance between said one face of the piston head and the flat face of the cylinder-head, an inlet valve in the flat face of the cylinder-head, said cylinder block also having formed in it a recess, the main portion of which is part-spherical to break into that side of the bore which is the longest, the wall of said recess forming, at top dead centre, with the other face of the piston head and with a part of the flat face of the cylinder-head the boundary of a combustion space which is substantially hemi-spherical.

4. A spark-ignition internal-combustion engine comprising a cylinder block having a cylinder bore therein, a piston having a head providing oppositely-inclined faces, a detachable cylinder-head provided with a continuous flat jointing face, said cylinder block having a co-operating jointing face and said faces being inclined at an acute angle to the axis of the bore and being parallel to one of the faces of the piston head, said piston being adapted to reciprocate in said bore with a minimum of clearance between said one face of the piston head and the flat face of the cylinder-head, an inlet valve in the flat face of the cylinder-head, said cylinder block also having formed in it a recess, the main portion of which is part-spherical to break into that side of the bore which is the longest, the wall of said recess forming, at top dead centre, with the other face of the piston head and with a part of the flat face of the cylinder-head the boundary of a combustion space which is substantially hemi-spherical, a sparking-plug disposed in said part of the flat face of the cylinder-head, and an exhaust valve in the wall of the main portion of said recess with its centre line passing substantially through the sparking points.

5. A spark-ignition internal-combustion engine comprising a cylinder block having a cylinder bore therein, a piston having a head providing oppositely-inclined faces, a detachable cylinder-head provided with a continuous flat jointing face, said cylinder block having a co-operating jointing face and said faces being inclined at an acute angle to the axis of the bore and being parallel to one of the faces of the piston head, said piston being adapted to reciprocate in said bore with a minimum of clearance between said one face of the piston head and the flat face of the cylinder-head, said cylinder block also having formed in it a recess, the main portion of which is part-spherical to break into that side of the bore which is the longest, the wall of said recess forming, at top dead centre, with the other face of the piston head and with a part of the flat face of the cylinder-head, the boundary of a combustion space of substantially hemi-spherical shape, and a sparking-plug disposed in said part of the flat face of the cylinder-head at approximately the centre thereof.

6. A spark-ignition internal-combustion engine comprising a cylinder block having a cylinder bore therein, a piston having a head providing oppositely-inclined faces, a detachable cylinder-head provided with a continuous flat jointing face, said cylinder block having a co-operating jointing face and said faces being inclined at an acute angle to the axis of the bore and being parallel to one of the faces of the piston head, said piston being adapted to reciprocate in said bore with a minimum of clearance between said one face of the piston head and the flat face of the cylinder-head, said cylinder block also having formed in it a recess, the main portion of which is part-spherical to break into that side of the bore which is the longest, the wall of said recess forming, at top dead centre, with the other face of the piston head and with a part of the flat face of the cylinder-head, the boundary of a combustion space of substantially hemi-spherical shape and a sparking-plug disposed in said part of the flat face of the cylinder-head, with the points of said plug substantially in alignment with the longest side of the bore.

7. A spark-ignition internal-combustion engine comprising a cylinder block having a cylinder bore therein, a piston having a head providing oppositely-inclined faces, a detachable cylinder-head provided with a continuous flat jointing face, said cylinder block having a cooperating jointing face and said faces being inclined at an acute angle to the axis of the bore and being parallel to one of the faces of the piston head, said piston being adapted to reciprocate in said bore with a minimum of clearance between said one face of the piston head and the flat face of the cylinder-head, an inlet valve in the flat face of the cylinder-head, the head of said valve lying closely adjacent said one face of the piston head at top dead centre, a recess of part-spherical shape in said cylinder block, the wall of said recess joining the bore through cylindrical portions and forming, at top dead centre, with the other face of the piston head and with a part of the flat face of the cylinder-head the boundary of a combustion space of generally hemi-spherical shape, a sparking-plug disposed in said part of the flat face of the cylinder-head at approximately the centre thereof, and an exhaust valve disposed symmetrically in the wall of said part-spherical recess with its axis substantially alined with the points of said plug.

8. A spark-ignition internal-combustion engine comprising a cylinder block having a cylinder bore therein, a piston having a head providing oppositely-inclined faces, a detachable cylinder-head provided with a continuous flat jointing face, said cylinder block having a cooperating jointing face and said faces being inclined at an acute angle to the axis of the bore and being parallel to one of the faces of the piston head, said piston being adapted to reciprocate in said bore with a minimum of clearance between said one face of the piston head and the flat face of the cylinder-head, said cylinder block also having formed in it a recess, the main portion of which is part-spherical, to break into that side of the bore which is the longest, the wall of said recess forming, at top dead centre, with the other face of the piston head and with a part of the flat face of the cylinder-head the boundary of a combustion space of substantially hemi-spherical form, and an exhaust valve symmetrically disposed in the wall of said part-spherical portion of the recess.

9. A spark ignition internal combustion engine comprising a cylinder block having a cylinder bore therein, a piston having a head providing oppositely inclined faces, a detachable cylinder head provided with a continuous flat jointing face, said cylinder block having a cooperating jointing face and said faces being inclined at an acute angle to the axis of the bore and being parallel to one of the faces of the piston head, said piston being adapted to reciprocate in said bore with a minimum of clearance between said one face of the piston head and the flat face of the cylinder head, said cylinder block also having a shallow recess formed in it to break into that side of the bore which is the longest, the wall of said recess forming, at top dead centre, with the other face of the piston head and with a part of the flat face of the cylinder head the boundary of the combustion space, a sparking plug disposed in said part of the flat face of the cylinder head, and an exhaust valve in the wall of the main portion of said recess.

10. A spark ignition internal combustion engine comprising a cylinder block having a cylinder bore therein, a piston having a head providing oppositely inclined faces, a detachable cylinder head provided with a continuous flat jointing face, said cylinder block having a cooperating jointing face and said faces being inclined at an acute angle to the axis of the bore and being parallel to one of the faces of the piston head, said piston being adapted to reciprocate in said bore with a minimum of clearance between said one face of the piston head and the flat face of the cylinder head, said cylinder block also having formed in its walls a recess, the main portion of which is part spherical to break into that side of the bore which is the longest, the wall of said recess forming, at top dead centre, with the other face of the piston head and with a part of the flat face of the cylinder head, the boundary of a combustion space of substantially hemi-spherical shape, and a sparking plug disposed in said part of the flat face of the cylinder head.

11. A spark ignition internal combustion engine comprising a cylinder block having a cylinder bore therein, a piston having a head providing oppositely inclined faces, a detachable cylinder head provided with a continuous flat jointing face, said cylinder block having a cooperating jointing face and said faces being inclined at an acute angle to the axis of the bore and being parallel to one of the faces of the piston head, said piston being adapted to reciprocate in said bore with a minimum of clearance between said one face of the piston head and the flat face of the cylinder head, an inlet valve in the flat face of the cylinder head, the head of said valve lying closely adjacent said one face of the piston head at top dead centre, a recess of part spherical shape in said cylinder block, the wall of said recess joining the said bore through cylindrical portions and forming at top dead centre, wtih the other face of the piston head and with a part of the flat face of the cylinder head the boundary of a combustion spaced generally hemi-spherical shape, a sparking plug disposed in said part of the flat face of the cylinder head, and an exhaust valve disposed symmetrically in the wall of said part spherical recess.

JOHN SWAINE.